(12) United States Patent
Sato et al.

(10) Patent No.: US 8,238,220 B2
(45) Date of Patent: Aug. 7, 2012

(54) PICKUP DEVICE

(75) Inventors: Makoto Sato, Tsurugashima (JP);
Masakazu Ogasawara, Tsurugashima (JP); Takuma Yanagisawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 731 days.

(21) Appl. No.: 12/376,595

(22) PCT Filed: Oct. 4, 2006

(86) PCT No.: PCT/JP2006/319841
§ 371 (c)(1),
(2), (4) Date: Feb. 6, 2009

(87) PCT Pub. No.: WO2008/041330
PCT Pub. Date: Apr. 10, 2008

(65) Prior Publication Data
US 2010/0177619 A1   Jul. 15, 2010

(51) Int. Cl.
*G11B 7/00* (2006.01)
*G11B 7/135* (2006.01)

(52) U.S. Cl. ............ 369/112.23; 369/112.03; 369/44.41; 369/124.12

(58) Field of Classification Search ............. 369/112.23, 369/112.03, 112.04, 112.05, 112.06, 112.07, 369/112.11, 112.12, 112.16, 112.17, 112.18, 369/112.19, 44.41, 124.12, 120, 121, 112.09, 369/112.14, 112.21, 112.27
See application file for complete search history.

(56) References Cited

U.S. PATENT DOCUMENTS

| | | | |
|---|---|---|---|
| 2001/0055262 A1* | 12/2001 | Kasazumi et al. | 369/112.02 |
| 2002/0101798 A1* | 8/2002 | Kim et al. | 369/44.23 |
| 2003/0035350 A1* | 2/2003 | Ogasawara et al. | 369/44.23 |
| 2004/0105374 A1* | 6/2004 | Ogasawara et al. | 369/112.02 |
| 2005/0099670 A1* | 5/2005 | Kimura et al. | 359/291 |
| 2006/0158996 A1* | 7/2006 | Kim | 369/112.03 |
| 2006/0187778 A1* | 8/2006 | Kaji et al. | 369/44.41 |

FOREIGN PATENT DOCUMENTS

| | | |
|---|---|---|
| JP | 08-129765 A | 5/1996 |
| JP | 2001-357545 A | 12/2001 |
| JP | 2004-281026 A | 10/2004 |

* cited by examiner

*Primary Examiner* — Joseph Feild
*Assistant Examiner* — Aneeta Yodichkas
(74) *Attorney, Agent, or Firm* — Sughrue Mion, PLLC

(57) ABSTRACT

A pickup device comprising an irradiation optical system including an objective lens to focus a ray bundle on a track of a recording surface of an optical recording medium to form a light spot, and a detection optical system including a photo detector to receive return light reflected from the light spot via the objective lens and perform photoelectric conversion and controls said objective lens in position according to electrical signals produced through operations on outputs of said photo detector.

5 Claims, 15 Drawing Sheets

Fig. 26
(1) 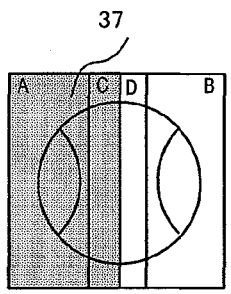
(2) 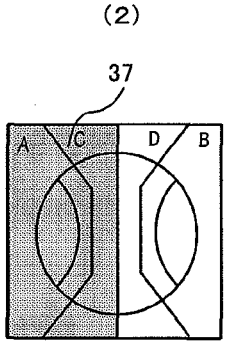
(3) 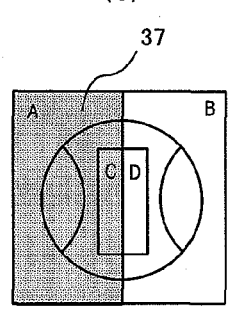
(4) 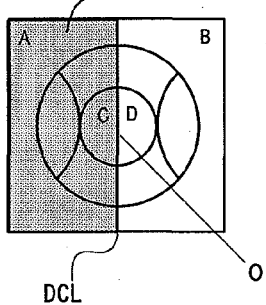
(5) 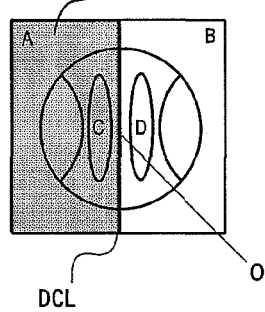
(6) 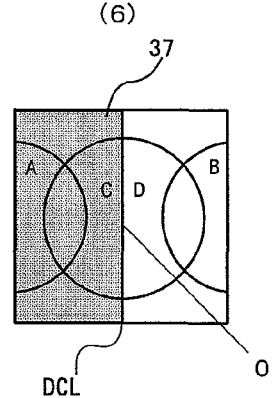
(7) 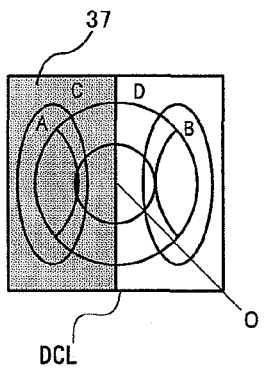
(8) 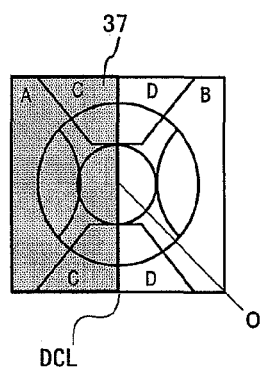
(9) 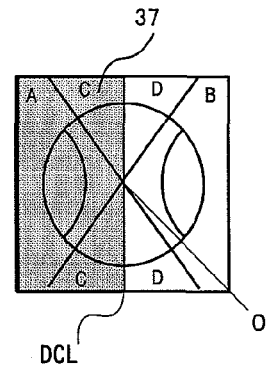
(10) 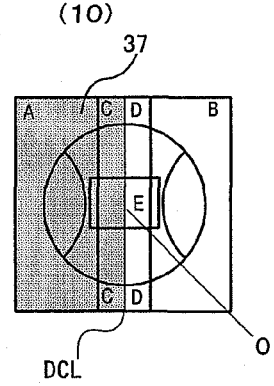
(11) 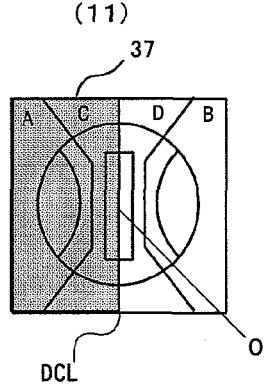
AREA WHERE 1/2 WAVELENGTH PLATE IS PLACED Fig. 27
(1) 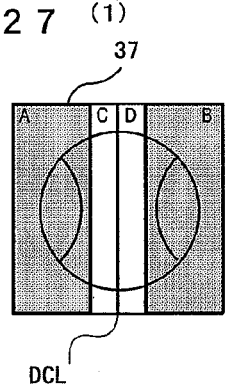
(2) 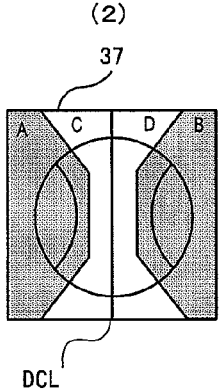
(3) 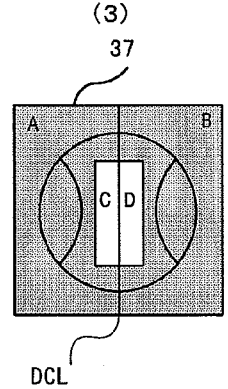
(4) 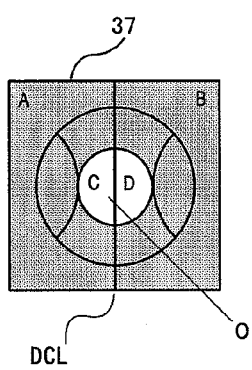
(5) 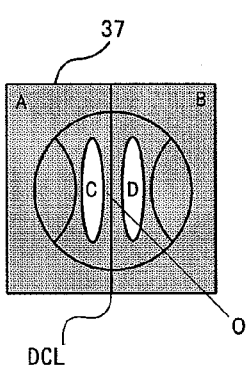
(6) 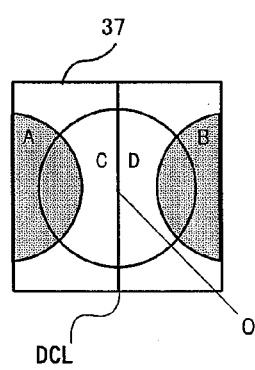
(7) 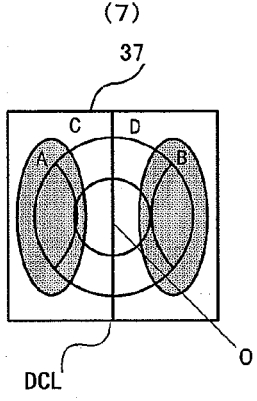
(8) 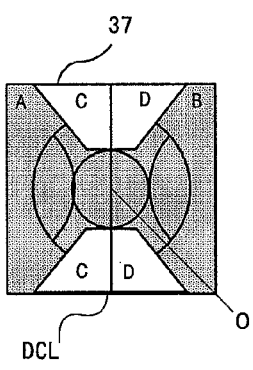
(9) 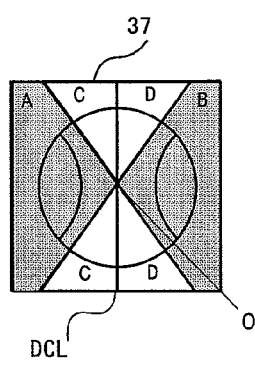
(10) 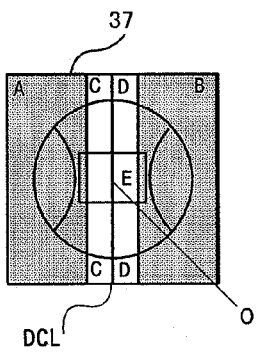
(11) 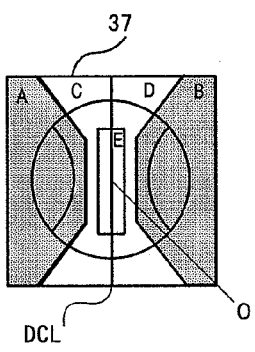
AREA WHERE 1/2 WAVELENGTH PLATE IS PLACED

PICKUP DEVICE

TECHNICAL FIELD

The present invention relates to an optical pickup device for a recording and reproducing apparatus for optical recording media such as optical discs and particularly to an optical pickup device that controls position for optimum focusing of a ray bundle onto a recording surface of an optical recording medium such as an optical disc having multiple recording layers laid one on top of another using an astigmatism method.

BACKGROUND ART

In these years, optical discs are widely used as means for recording and reproducing data such as video data, voice data, and computer data. For example, high density recording optical discs called Blu-ray™ Disc have been put to practical use. With further high density recording optical discs, in order to read out information from one surface side with use of an optical pickup device, a ray bundle needs to be condensed to be focused on a track on a recording surface of interest (in-focus position or optimum focusing position), and in addition the condensed light spot needs to be right on a track of interest. Hence, focusing and tracking servo control is performed to make the light spot be right on a recording portion of a recording layer of an optical disc.

The servo control uses servo error signals (push-pull signals such as a focus error signal and a tracking error signal), in which noise due to external disturbance is mixed causing the offset of the signals, hence presenting a problem. Further noise reduction is required of pickup devices.

For example, a technique is known in which an operation is performed on the light distribution of the far field in an optical pickup device to have the offset of the focus error signal cancelled out. (Refer to Patent Document 1).

The conventional art disclosed in Patent Document 1 is for reducing the offset of the tracking error signal that occurs due to variation in the track pitch of guide tracks.

The embodiment 6 recited in Patent Document 1, paragraphs 0130 to 0133 describes that a beam dividing element 61 having areas 61a to 61d of a four-type divided pattern as shown in FIG. 1 is used in a detection optical system of an optical pickup device to divide return light from an optical disc and allow most of the light to pass through to be a zeroth-order non-diffracted light beam 710 while the areas 61a to 61d diffract the rest into beams 71a to 71d, that in a photo detector 36 having photoreceptor sections 36a to 36h as shown in FIG. 2, the photoreceptor sections 36a to 36d receive the beam 710, and the photoreceptor sections 36g, 36e, 36f, 36h receive the beams 71a, 71b, 71c, 71d respectively, and that the photoreceptor sections 36a to 36h output current signals 136a to 136h corresponding to their respective amounts of received light, operations being performed on them to obtain servo error signals. In the conventional art of the embodiment 6, the beams 71b, 71c (first-order light beams) passing through the areas 61b, 61c are received by the photoreceptor sections 36e, 36f separate and away from the photoreceptor sections 36a to 36d for the main ray bundle (zeroth-order light beam), and operations are performed on their outputs.

In the embodiment 23 recited in Patent Document 1, paragraphs 0292 to 0303, using a polarization hologram element 501 that is divided into six areas 520a, 520b, 521a, 521b, 521c, 521d as shown in FIG. 3, the return light is directed to a four-division photo detector 30 having four photoreceptor sections 30a to 30d as shown in FIG. 4. As described in Patent Document 1, paragraph 0297, light having passed through the area 521a becomes a light beam 541d, which is received by the photoreceptor section 30c; light having passed through the area 521b becomes a light beam 541c, which is received by the photoreceptor section 30b; light having passed through the area 521c becomes a light beam 541b, which is received by the photoreceptor section 30d; and light having passed through the area 521d becomes a light beam 541a, which is received by the photoreceptor section 30a, positioned in a diagonal relationship to each other.

The description of the paragraph 0302 of Patent Document 1, embodiment 23, recites that because the polarization hologram element also moves at the same time that the objective lens moves, the division lines do not relatively move, resulting in the amount of offset being small, that in order to reduce the amount of this offset, the regions around the center of the light beam are exchanged in position and detected, thereby reducing the influence of the shift of the light amount distribution, and that by exchanging the regions in the diagonal relationship, an FE signal of an astigmatism method and a TE signal of a phase differential method are not greatly affected.

Patent Document 1: Japanese Patent Application Laid-Open Publication No. 2004-281026

DISCLOSURE OF THE INVENTION

Problem to be Solved by the Invention

Although in the embodiment 23 described in the paragraph 0302 of Patent Document 1, the reduction in offset is obtained using one four-division photo detector, the problem occurs that an enough swing of the focus error signal (the astigmatism method) is not obtained.

Generally, when changing the defocus amount relative to the in-focus position in the astigmatism method, the shape of the light spot on a photo detector 40 changes as shown in FIG. 5 (1)-(5). When focused (FIG. 5 (3)), the light spot is substantially circular and, when defocused, changes to a line image oblique at an angle of 45° due to astigmatism given by a detection lens 38, which is a straight line passing through a point O corresponding to the optical axis of the ray bundle. The focus error signal FES is calculated as a difference of diagonal components: FES=(Det1+Det4)−(Det2+Det3). When focused (FIG. 5 (3)), light is incident equally on the four sections of the photo detector, resulting in FES=0. In contrast, in the case of the line image when defocused of, e.g., FIG. 5 (1), almost all of the light is incident on the Det1 and Det4, and hence the FES takes a maximum value. On the other hand, in the case of the line image when defocused of FIG. 5 (5), the FES takes a minimum value.

When changes in FES level of FIG. 5 (1)-(5) are plotted as points 1-5 on a graph against the displacement (defocus) relative to a track position, a so-called S-curve characteristic shown in FIG. 6 is obtained. As seen from FIGS. 5, 6, as the line image becomes thinner in FIG. 5 (1), (5), the swing of the focus error signal becomes larger, resulting in a good error signal.

In view of the S-curve characteristic of the FES, the state of the light spots on the sections of the photo detector and the focus error signal obtained from them in the embodiment 23 of Patent Document 1 are examined.

FIG. 7 shows in detail the distribution of light intensity over the conventional photo detector of FIG. 4. In the distribution of light intensity when focused in FIG. 7 (2), light beams A, B, C, D, E, F respectively correspond to the light beams 540a, 540b, 541d, 541c, 541b, 541a in FIG. 4 divided into by the areas 520*a*, 520*b*, 521*a*, 521*b*, 521*c*, 521*d* of the conventional polarization hologram element 501 shown in FIG. 3. Light spots on the photo detector as shown in FIG. 7 (1)-(3) are produced. Sections Det1, Det2, Det3, Det4 of the photo detector of FIG. 7 correspond to the photoreceptor sections 30*a*, 30*b*, 303*c*, 30*d* shown in FIG. 4. Here, how the light spot changes from the state when focused (FIG. 7 (2)) due to defocusing will be described.

First, because the light beams A, B are not subjected to a change in position by the polarization hologram element 501, the light beams A, B change to a linear light spot passing through the point O due to defocusing.

As to the four divided light beams C to F in the center, the light beam C has been diffracted in the upper left area (FIG. 3) and directed diagonally to the position of the Det4 by the action of the polarization hologram element 501. The point c (in lower case) corresponds to the optical axis of the light beam C, and when defocused, the light beam C changes to a linear light spot passing through this point c.

Likewise, the light beams D, E, F change to linear light spots passing through points d, e, f (in lower case) respectively when defocused.

As a result, where light is defocused into the near side so that all the light beams form a line image, as shown in FIG. 7 (1), a fair amount of light is incident on Det2, Det3 as well as Det1, Det4 (forming five line images passing through the five points). Likewise, where light is defocused into the far side, as shown in FIG. 7 (3), the magnitude of the FES when defocused is not sufficient. That is, the problem occurs that the swing of the characteristic of FIG. 6 is reduced.

Accordingly, an object of the present invention is to provide a pickup device that can reduce an offset occurring at the boundary between an already recorded area and an unrecorded area with suppressing the adverse effect of the general astigmatism method on the focus error signal to a minimum.

Means for Solving the Problem

According to claim 1, there is provided a pickup device which comprises an irradiation optical system including an objective lens to focus a ray bundle on a track of a recording surface of an optical recording medium to form a light spot, and a detection optical system including a photo detector to receive return light reflected from said light spot via said objective lens and perform photoelectric conversion and controls said objective lens in position according to electrical signals produced through operations on outputs of said photo detector, wherein said photo detector has at least two photoreceptor sections positioned axis-symmetrical with respect to a detection-side division line extending through an optical axis of said return light and parallel to said track;

wherein said pickup device comprises a dividing element placed in an optical path between said photo detector and said objective lens;

wherein said dividing element includes at least two inner divided areas positioned axis-symmetrical with respect to a deflection-side division line extending through said optical axis of said return light and parallel to said track, and at least two outer divided areas positioned sandwiching said inner divided areas and axis-symmetrical with respect to said deflection-side division line;

wherein said outer divided areas include overlap regions shared by ±first-order light beams diffracted by said track and a zeroth-order light beam of said return light and direct light beams from said overlap regions to said photoreceptor sections of said photo detector so as to be axis-symmetrical with respect to said detection-side division line;

wherein said inner divided areas direct parts of a light beam from the other region than said overlap regions to said photoreceptor sections of said photo detector so as to be axis-symmetrical with respect to said detection-side division line, said other region being divided axis-symmetrically along said deflection-side division line; and wherein said inner divided areas are formed such that the parts of the light beam from the other region than said overlap regions are exchanged in position across said detection-side division line and directed to said photoreceptor sections of said photo detector, or said outer divided areas are formed such that the light beams from said overlap regions are exchanged in position across said detection-side division line and directed to said photoreceptor sections of said photo detector.

Boundaries between the inner divided areas and the outer divided areas preferably do not intersect with the overlap regions.

The pickup device preferably comprises a ½ wavelength plate positioned in an optical path of the return light to overlie only a group of areas on the same side of the inner divided areas and outer divided areas positioned axis-symmetrical with respect to the deflection-side division line on the dividing element, or a ½ wavelength plate positioned in an optical path of the return light to overlie only the inner divided areas on the dividing element, or a ½ wavelength plate positioned in an optical path of the return light to overlie only the outer divided areas on the dividing element.

The pickup device may comprise an astigmatism element to give the return light directed to the photoreceptor sections astigmatism whose direction is set at an angle of 45° relative to a direction in which the track extends, and the photo detector may have four photoreceptor sections divided into along a division line extending parallel to the track and a division line perpendicular to the division line with the optical axis of the return light as the center.

The dividing element may have a transmissive or shielding area around the optical axis of the return light in the inner divided areas that is of a point-symmetrical shape with respect to the optical axis of the return light.

At least either the inner divided areas or outer divided areas of the dividing element are preferably constituted by a hologram element, a liquid crystal optical element, or a polarization hologram element.

BRIEF DESCRIPTION OF THE DRAWINGS

FIG. 26 is a schematic plan view showing other 11 examples of the hologram element in the optical pickup device according to the embodiment of the present invention.

FIG. 27 is a schematic plan view showing other 11 examples of the hologram element in the optical pickup device according to the embodiment of the present invention.

EXPLANATION OF REFERENCE NUMERALS

Figure 1:
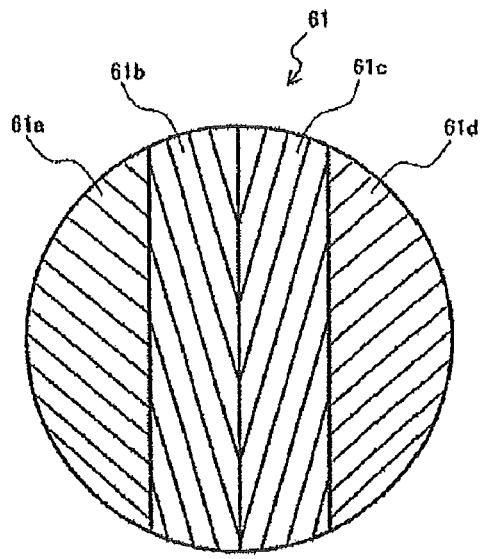
FIG. 1 is a configuration of a light beam dividing element forming part of a conventional art optical information apparatus.
Figure 2:
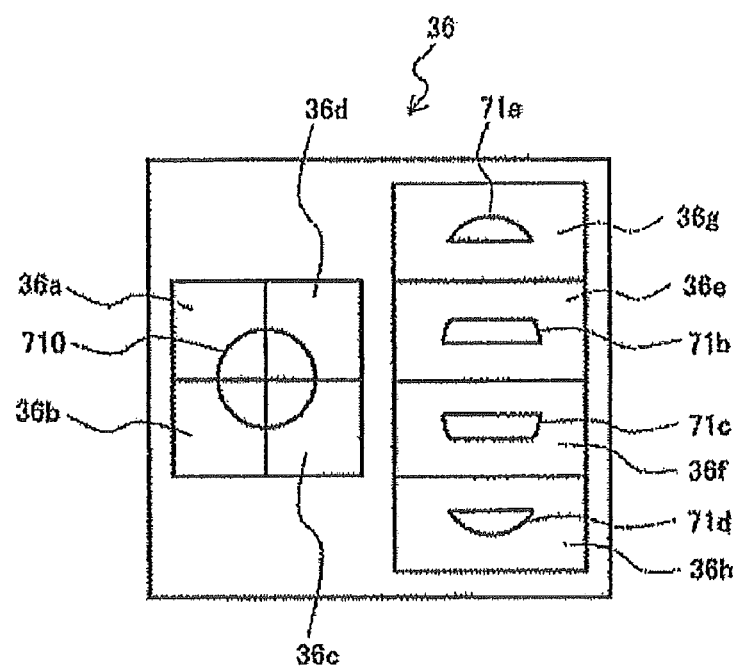
FIG. 2 shows a relationship between a photo detector forming part of an optical pickup and light beams in the conventional art optical information apparatus.
Figure 3:
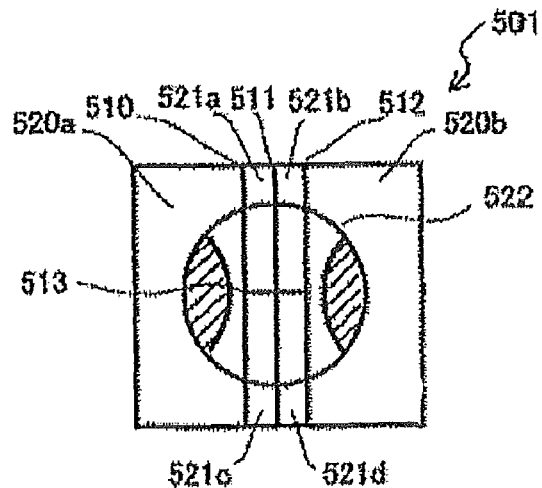
FIG. 3 shows a relationship between the division of a polarization hologram element and light beams in the conventional art optical information apparatus.
Figure 4:
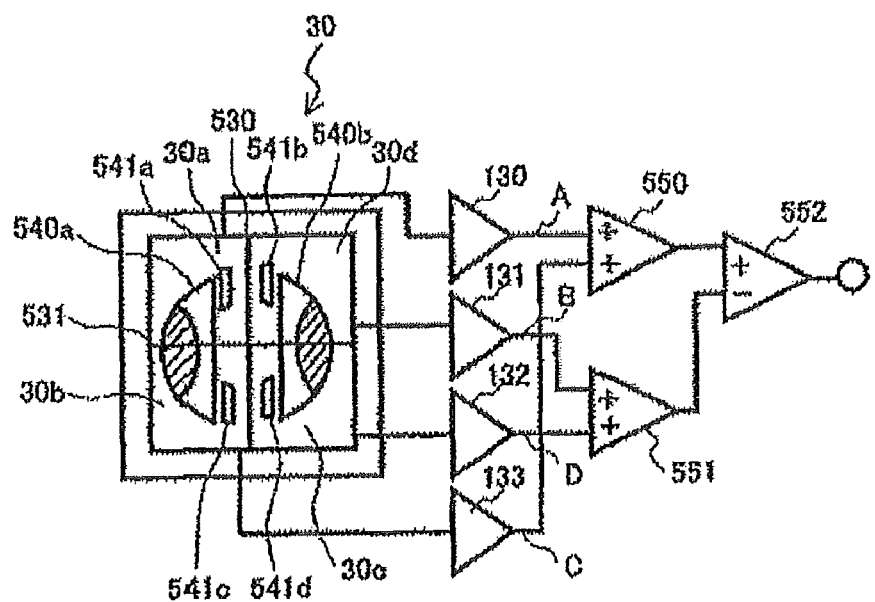
FIG. 4 shows a relationship between the division of a photo detector and light beams in the conventional art, and the configuration of electric circuitry.
Figure 5:
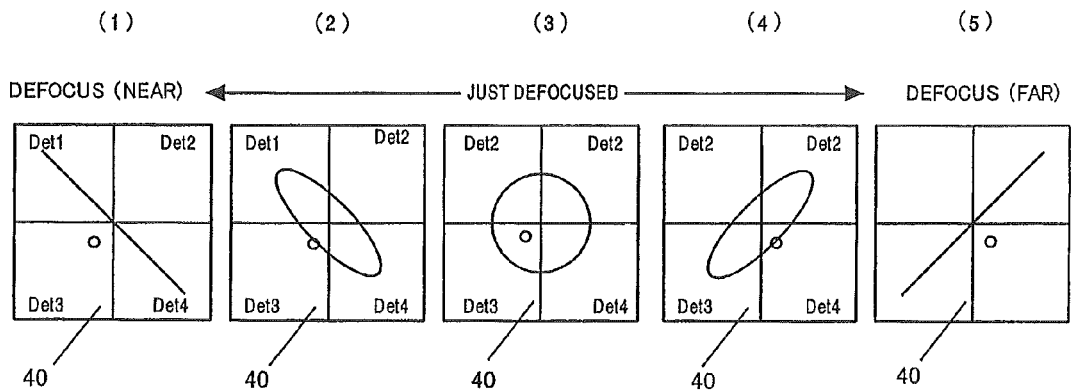
FIG. 5 is a front view of a photo detector for explaining the shape of a light spot by an astigmatism method that changes as the defocus amount is changed from in-focus position.
Figure 6:
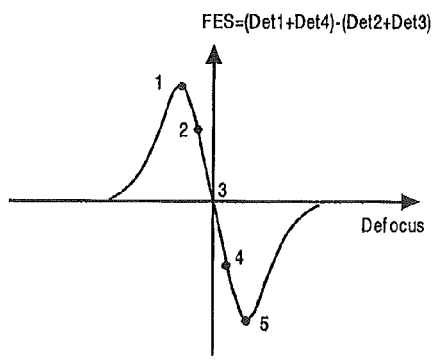
FIG. 6 is a graph for explaining a focus error signal by the astigmatism method that changes as the defocus amount is changed from in-focus position.

1 Optical disc
3 Pickup device
31 Semiconductor laser
32 Sub-beam generation grating
33 Beam splitter
34 Collimator lens
35 ¼ wavelength plate
OB Objective lens
38 Detection lens
37 Hologram element
40 Photo detector
Det1, Det2, Det3, Det4 Photoreceptor section

MODE FOR CARRYING OUT THE INVENTION

Optical pickups according to embodiments of the present invention will be described below with reference to the drawings.

Figure 8:
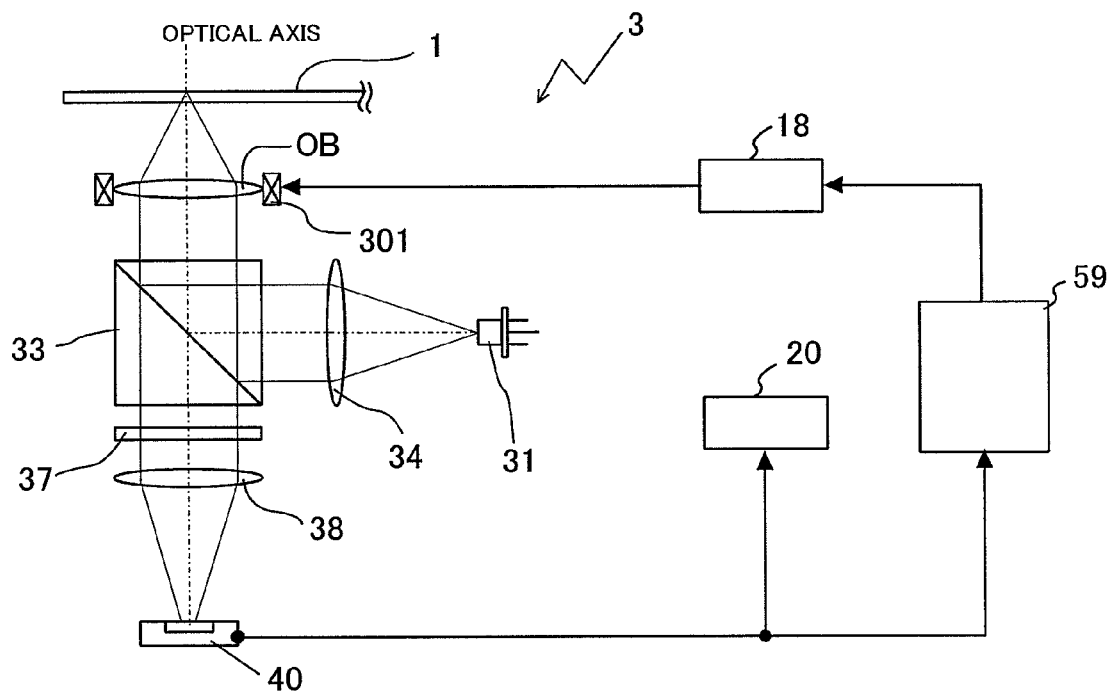
FIG. 8 is a diagram schematically showing the configuration of an optical pickup device according to an embodiment of the present invention.

FIG. 8 shows schematically the configuration of an optical pickup device 3.

The optical pickup device 3 comprises a semiconductor laser 31 as a light source, a beam splitter 33, a collimator lens 34 for collimating diverging light to be parallel light, an objective lens OB, a hologram element 37 as a dividing element for dividing and deflecting transmitted light into a plurality of light beams, a detection lens 38, and a photo detector 40 for performing photoelectric conversion.

Light from the semiconductor laser 31 is made to be parallel light by the collimator lens 34 and is incident on the beam splitter 33 to be reflected to an optical disc 1. The light is focused onto a recording surface of the optical disc 1 by the objective lens OB, and reflected light passes through the objective lens OB again to become parallel light, which passes through the beam splitter 33 to be incident on the hologram element 37. The light is diffracted and divided by the hologram element 37 into a plurality of light beams, which pass through the detection lens 38 and are directed to the photo detector 40.

The optical disc 1 is an optical recording medium having multiple recording layers laid one on top of another via a spacer layer and is mounted on a turn table (not shown) of a spindle motor to be away from the objective lens OB. Tracks such as rows of pits or grooves are formed concentrically or spirally in the signal surface of the optical disc 1.

The objective lens OB for focusing a ray bundle on a target recording surface of the optical disc 1 to form a spot is included in an irradiation optical system. The objective lens OB is movably supported by an actuator 301 for focus servo and tracking servo and is controlled in position via a drive circuit 18 connected thereto according to electrical signals produced through operations on the outputs of the photo detector 40. The objective lens OB also belongs to a detection optical system for receiving return light reflected from the spot and leading it to the photo detector 40 via the beam splitter 33.

The beam splitter 33 has a semitransparent mirror therein and directs reflected light in a different direction from that of transmitted light. The return light incident on the objective lens OB is then separated by the beam splitter 33 from the irradiation optical system.

The detection lens 38 placed between the beam splitter 33 and the photo detector 40 gives astigmatism to it so that focus servo is performed (the astigmatism method). Astigmatism is aberration caused by the focal distance of a lens optical system having different values at two cross-sections orthogonal to the optical axis. If a point is imaged through an optical system having astigmatism, the image becomes vertically long, circular, or horizontally long depending on its position between the two cross-sections. Note that the hologram element 37 and the detection lens 38 may be designed to be placed conversely so that after diffracted, the return light is given astigmatism.

Figure 9:
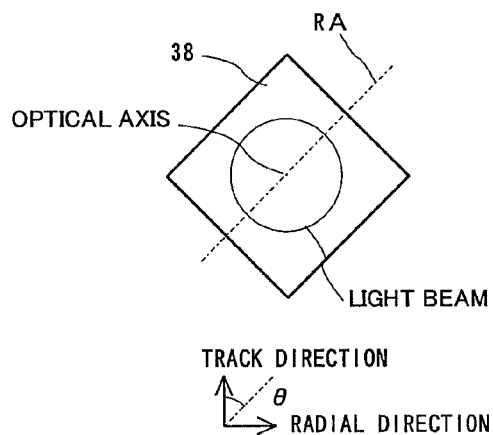
FIG. 9 is a schematic plan view showing a multi-lens including a cylindrical surface as an example of a detection lens in the optical pickup device according to the embodiment of the present invention.

For example, a multi-lens including a cylindrical surface may be used as the detection lens 38. FIG. 9 is a schematic plan view showing a multi-lens including a cylindrical surface as an example of the detection lens 38. In a plane orthogonal to the optical axis of the return light, the center axis RA (the ridge line or the rotational symmetry axis of the cylinder curved surface forming a lens surface) of this cylindrical lens is placed extending at an angle q of 45° relative to a direction perpendicular to a radial direction of the optical disc 1 (a track direction) and crossing the optical axis of the return light as shown in FIG. 9. The direction in which the center axis RA of the cylindrical lens of the detection lens 38 extends is an astigmatism direction.

Figure 10:
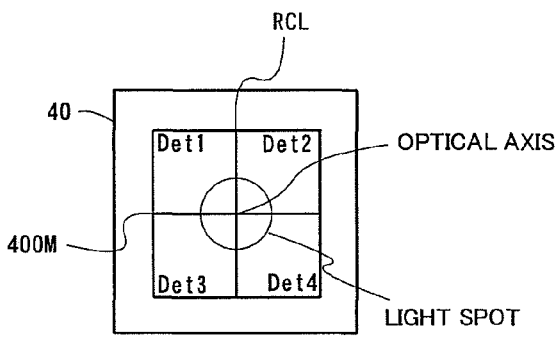
FIG. 10 is a schematic plan view showing an example of a photo detector in the optical pickup device according to the embodiment of the present invention.

FIG. 10 is a schematic plan view showing an example of the photo detector 40. This photo detector 40 comprises four photoreceptor sections (Det1, Det2, Det3, Det4) of an equal area, the first to fourth quadrants, that are arranged adjacent to, and independent of, each other with two orthogonal division lines RCL, 400M as their boundaries in a plane orthogonal to the optical axis of the return light, the division line RCL being parallel to the track direction, the division lines RCL, 400M crossing at their intersection the optical axis of the return light. Herein, the track and the track direction in the detection optical system refer to the image of a track and its direction at each element of the detection optical system. The photoreceptor sections of the photo detector 40 are connected to a demodulation circuit 20 for producing a reproduced signal and a servo control unit 59 for a spindle motor, a slider, and tracking, and operations are performed on the photoelectric converted outputs of them to generate the focus error signal, the tracking error signal, and the like. The servo control unit 59 controls the drive circuit 18.

As such, the pickup device 3 comprises the irradiation optical system including the objective lens OB to focus the ray bundle on a track of a recording surface of an optical recording medium to form a light spot and the detection optical system including the photo detector 40 to receive return light reflected from the light spot via the objective lens OB and perform photoelectric conversion and controls the objective lens OB in position according to electrical signals produced through operations on the outputs of the photoreceptor sections of the photo detector 40.

Not being limited to a four-division photo detector, the photo detector 40 may be one having at least two photoreceptor sections positioned axis-symmetrical with respect to a detection-side division line RCL extending through the optical axis of the return light in the detection optical system and parallel to the track as long as a tracking error signal, a push-pull signal, is obtained.

Figure 11:
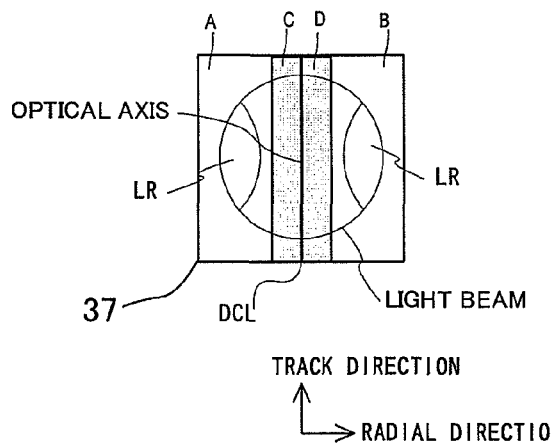
FIG. 11 is a schematic plan view showing an example of a hologram element in the optical pickup device according to the embodiment of the present invention.

The hologram element 37 as a dividing element placed in the optical path between the photo detector 40 and the objective lens OB includes at least two inner divided areas C, D positioned axis-symmetrical with respect to a deflection-side division line DCL extending through the optical axis of the return light and parallel to the track and at least two outer divided areas A, B positioned sandwiching the inner divided areas and axis-symmetrical with respect to the deflection-side division line DCL as shown in FIG. 11.

Figure 12:
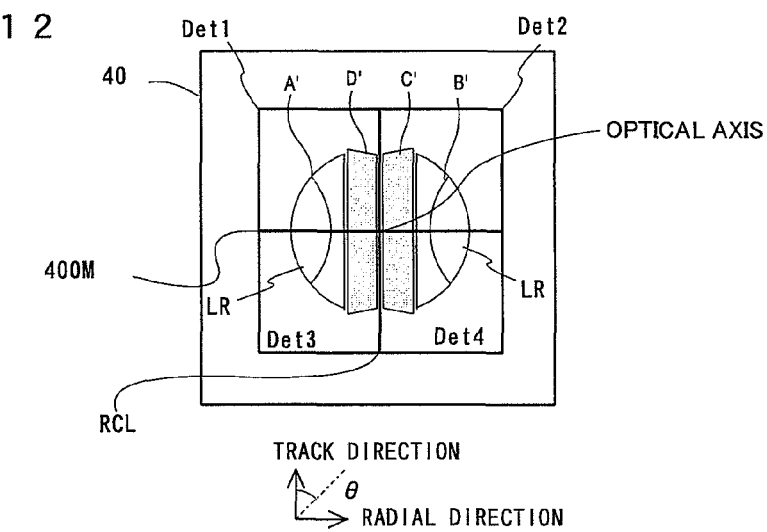
FIG. 12 is a schematic plan view showing an example of a photo detector in the optical pickup device according to the embodiment of the present invention.

The outer divided areas A, B of the hologram element 37 include overlap regions LR shared by ±first-order light beams diffracted by the track and a zeroth-order light beam of the return ray bundle and direct light beams from the overlap regions LR to the photoreceptor sections of the photo detector 40 so as to be axis-symmetrical with respect to the detection-side division line RCL as shown as A', B' in FIG. 12.

The inner divided areas C, D of the hologram element 37 direct parts of a light beam from the other region than the overlap regions LR, which region is divided axis-symmetrically along the deflection-side division line DCL, to the photoreceptor sections of the photo detector 40 so as to be axis-symmetrical with respect to the detection-side division line RCL as shown as D', C' in FIG. 12.

As shown in FIGS. 11 and 12, the inner divided areas C, D of the hologram element 37 are formed such that parts of the light beam from the other region than the overlap regions LR are exchanged in position across the detection-side division line RCL and directed to the photoreceptor sections of the photo detector 40. The parts cut off the ray bundle by the inner divided areas C, D parallel to each other are irradiated and imaged onto the photoreceptor sections of the photo detector 40, keeping parallel to each other and axis-symmetrical with respect to the deflection-side division line DCL.

Where light beams from the outer divided areas A, B of the hologram element 37 are exchanged in position across the detection-side division line RCL and directed to the photoreceptor sections of the photo detector 40, the parts cut off the ray bundle by the inner divided areas C, D parallel to each other are, without being exchanged in position across the detection-side division line RCL, irradiated and imaged onto the photoreceptor sections of the photo detector 40, keeping parallel to each other and axis-symmetrical with respect to the deflection-side division line DCL.

As such, in the configuration of the optical pickup shown in FIG. 8, a dividing element such as the hologram element 37 is placed in the optical path for return light from the optical disc 1, thereby making a change to the distribution of light over the photo detector 40.

As to the method of dividing it, the hologram element is divided into two left and right regions along the deflection-side division line DCL passing through the optical axis of the return light and parallel to the track direction, and each of the regions is further divided into two areas, thereby dividing it into four outer and inner areas A to D. The outer divided areas A, B include most of the overlap regions LR shared by light beams diffracted by the track, and the areas A, B and also the areas C, D are positioned to be axis-symmetrical with respect to the deflection-side division line DCL.

In the inner divided areas C, D of the hologram element 37 shown in FIG. 11, different hologram patterns are carved respectively and act to deflect light passing through the inner divided areas in certain directions. The inner divided areas C, D have the deflecting function and act on only the return light from the optical disc 1. Further, the hologram patterns are of a blaze type or a stair-like multistep type in shape, and almost all of diffracted light are the first-order light beams.

Where light beams from the outer divided areas A, B of the hologram element 37 are exchanged in position across the detection-side division line RCL and directed to the photoreceptor sections of the photo detector 40, different hologram patterns may be carved respectively in the outer divided areas A, B of the hologram element 37.

With the photo detector 40, a four-division photo detector, shown in FIG. 10, by taking the difference between sums of its photoreceptor section outputs (Det1+Det3) and (Det2+Det4), a tracking error signal is obtained. In order to obtain this push-pull signal, the photo detector 40 need only be divided into at least two parts radially, namely, along a division line parallel to the track direction perpendicular to the radial direction.

By using the cylindrical surface of the detection lens 38 and the photo detector 40, i.e., a four-division photo detector, the astigmatism method can be employed for focus servo, and the push-pull method can be employed for tracking servo.

The focus error signal FES by the astigmatism method is obtained by the operation according to the following equation (1):

$$FES=(Det1+Det4)-(Det2+Det3) \quad (1)$$

The tracking error signal TES by the push-pull method is obtained by the operation according to the following equation (2):

$$TES=(Det1+Det3)-(Det2+Det4) \quad (2)$$

An RF signal RF is obtained by taking the sum of all the photoreceptor section outputs:

$$RF=Det1+Det2+Det3+Det4.$$

Next, the action and effect of the hologram element 37 will be specifically described. For that purpose, first, the generation principle for the tracking error signal by the push-pull method will be described using FIG. 13.

Figure 13:
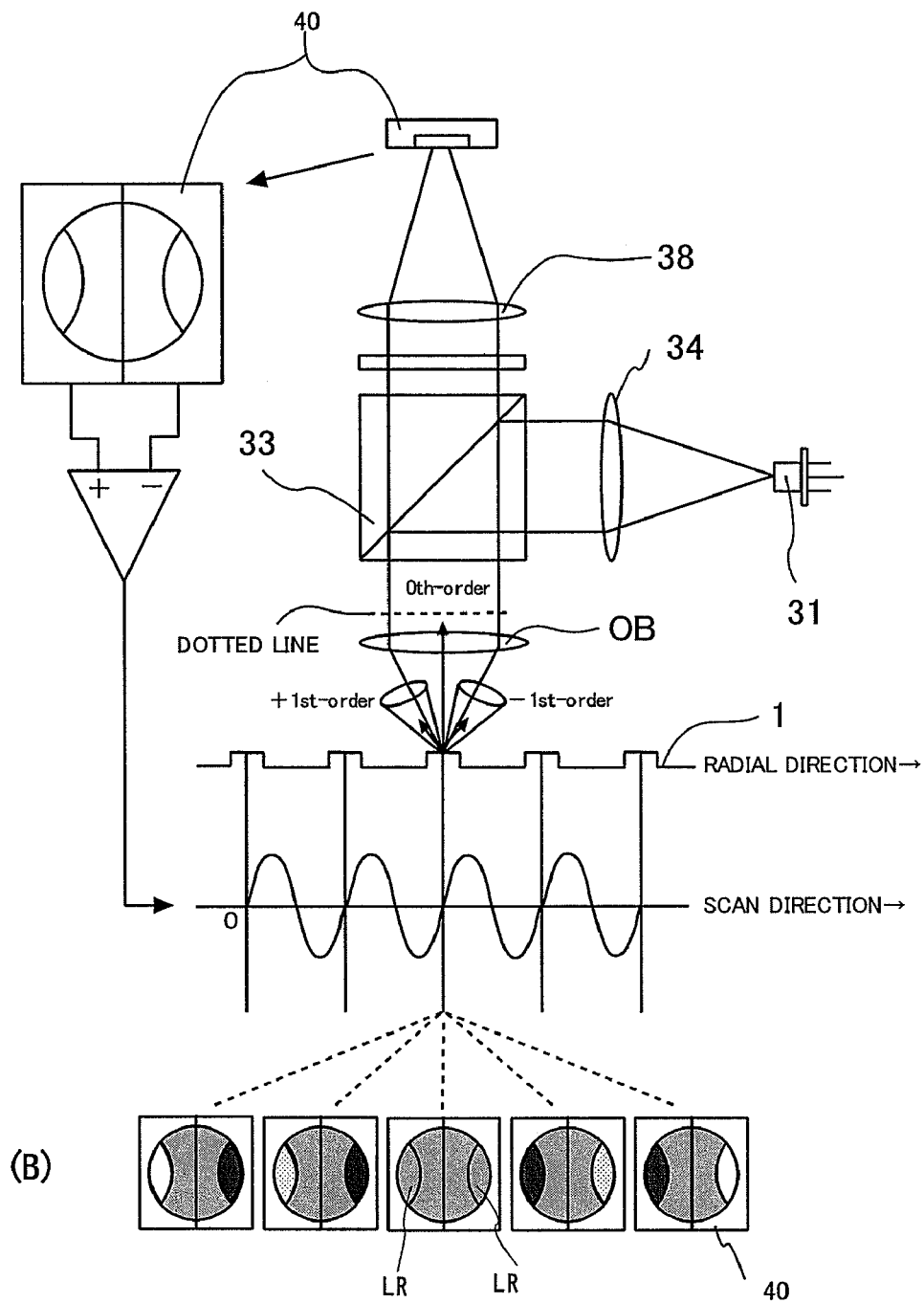
FIG. 13 is a view for explaining the generation principle for a tracking error signal by a push-pull method in the optical pickup device according to the embodiment of the present invention.

As shown in FIG. 13, periodically arranged tracks (grooves or pit rows) exist on the information recording surface of the optical disc 1, and light irradiated onto the optical disc is diffracted by this periodic structure.

When incident laser light is focused on the recording surface of the optical disc 1 by the objective lens OB, multiple diffracted light beams (±first-order, ±second-order, . . . ) reflected in directions in a plane orthogonal to the track occur as well as the zeroth-order light beam reflected in the direction of the incident light. Their diffraction angles are determined by the period of tracks, and hence the diffraction angles are always the same for tracks of the same period.

Only ones of the multiple diffracted light beams that pass through the pupil of the objective lens OB are detected by the photo detector 40 (of two divisions). Because track intervals of high-density optical discs such as DVDs and Blu-ray Disc are set small, it is only the ±first-order light beams that overlap the zeroth-order light beam in the pupil, and the ±second-order and higher order light beams do not enter the pupil. Hereinafter, it is thought that only the zeroth-order light beam and the ±first-order light beams exist in the pupil.

When the irradiating position of light varies in a direction orthogonal to the track, the diffraction angles of the ±first-order light beams, namely, their overlaps with the zeroth-order light beam do not vary, but the phases of the plus and minus first-order light beams relative to the zeroth-order light beam vary. The light intensity of the overlaps of the diffracted light beams becomes strong when interfering constructively with the zeroth-order light beam and weak when interfering destructively. The far field pattern at the position indicated by a dotted line in FIG. 13 changes in only the intensities of the overlaps of the diffracted-beam circles as shown in FIG. 13 (B), and when this pattern is received by the photoreceptor sections of the photo detector 40, by taking the difference between the photoreceptor section outputs of the photo detector 40 divided radially into two parts, a signal indicating deviation from the track can be obtained. This is the generation principle for the tracking error signal by the push-pull method.

Theoretically, without the overlaps with the ±first-order light beams, the zeroth-order light beam would always be constant in light intensity, and the tracking error signal is expected to be at zero when right on the track and when at the middle position between tracks, where the phases of the plus and minus first-order light beams are equal. Hence, while the light spot is made to radially cross tracks of certain intervals, sine waves are detected as shown in FIG. 13.

However, there is a case where an exception occurs because of being affected by an adjacent track. The case of being subject to an effect of an adjacent track is, for example, where in a recordable or rewritable optical disc the light spot is located on a track near the boundary between an already recorded area where information is already recorded and an unrecorded area where not yet recorded.

Figure 14:
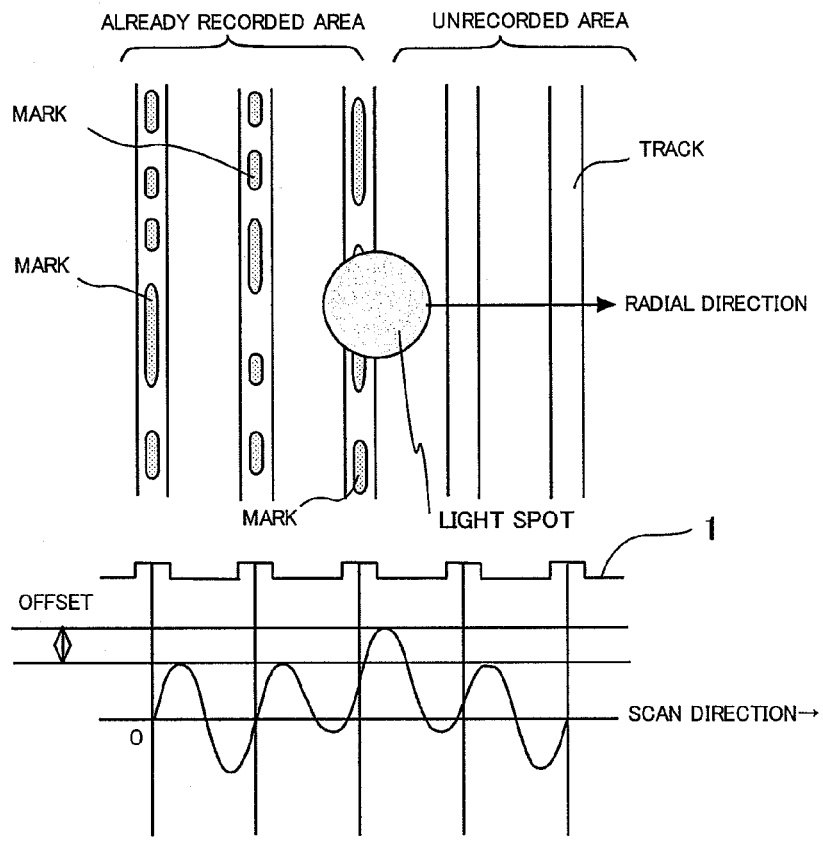
FIG. 14 is a view for explaining the state of the tracking error signal generated by the push-pull method in the optical pickup device according to the embodiment of the present invention.

Because generally a mark (information pit) already recorded area is smaller in reflectance than an unrecorded area (the converse is true in some cases), when the light spot is located on a track on the boundary between an already recorded area on the left side and an unrecorded area on the right side as shown in FIG. 14, an extreme situation occurs where a low reflectance area is on the left side of the light spot with a high reflectance area being on the right side.

Figure 15:
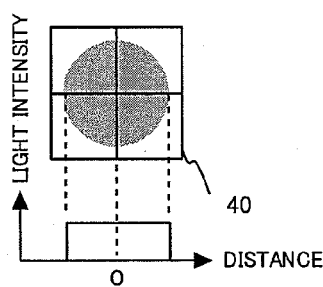
FIG. 15 is a schematic plan view for explaining an ideal light spot intensity distribution over a photo detector in an optical pickup device.
Figure 16:
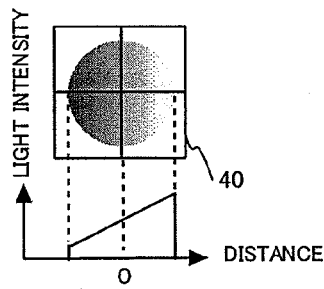
FIG. 16 is a schematic plan view for explaining a light spot intensity distribution over the photo detector in the optical pickup device according to the embodiment of the present invention.

Although the zeroth-order light beam of the reflected light is supposed to be constant in intensity without an intensity gradient as shown in FIG. 15, in this situation the zeroth-order light beam will be affected by the reflectance of the neighboring area to have a radial intensity gradient as shown in FIG. 16. In this case, even when the light spot is located right on the track, the tracking error signal is not at zero but has a certain level, and hence the tracking error signal takes on a waveform having a certain amount of offset only near the boundary between the already recorded area and the unrecorded area. Hence, while the light spot is made to radially cross tracks of certain intervals, sine waves having an offset are detected as shown in FIG. 14. Thus, the problem occurs that tracking goes out of lock at the boundary between the already recorded area and the unrecorded area.

The offset of the tracking error signal is caused by the zeroth-order light region in the light spot having an intensity gradient, which is supposed to have no intensity gradient.

The inventor found out that by examining the intensity gradient of the zeroth-order light region, what level of offset exists can be determined.

The inner divided areas C, D of the hologram element 37 shown in FIG. 11 are an only-the-zeroth-order-beam region outside the overlaps of the diffracted light beam circles. Thus, the result of:

$$\text{(light amount of C)}-\text{(light amount of D)} \quad (3)$$

indicates the amount (level) of offset. Since the value of the equation (1) does not include a component of the tracking error signal, by subtracting the value of the equation (3) from the usual tracking error signal, the offset can be reduced. Namely, by performing the operation:

$$\text{(light amount of A)}-\text{(light amount of B)}-k(\text{(light amount of C)}-\text{(light amount of D)}), \quad (4)$$

where k is a real number, the tracking error signal having the offset reduced can be obtained.

By inserting the hologram element 37 for dividing as shown in FIG. 11 in the detection optical system to direct light beams from the outer divided area A and the inner divided area D to the same photoreceptor sections (Det1+Det3) of the photo detector 40 and light beams from the outer divided area B and the inner divided area C to the same photoreceptor sections (Det2+Det4) of the photo detector 40, the operation of the equation (2) as usual can produce the same effect as the equation (4), without increasing the number of photoreceptor sections or divisions.

Changing the sizes of the inner divided areas C, D axis-symmetrically or changing the diffraction efficiency of the hologram element 37 can produce the same effect as changing the value of the k of the equation (4).

Figure 17:
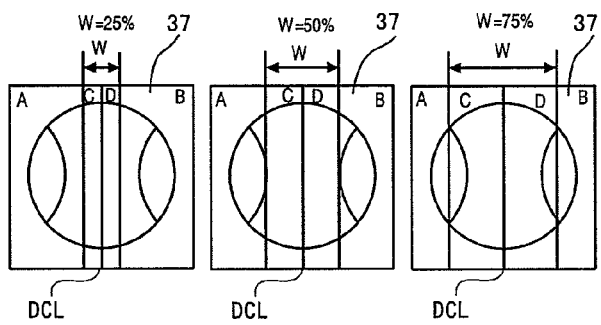
FIG. 17 is a schematic plan view showing three examples of the hologram element in the optical pickup device according to the embodiment of the present invention.
Figure 18:
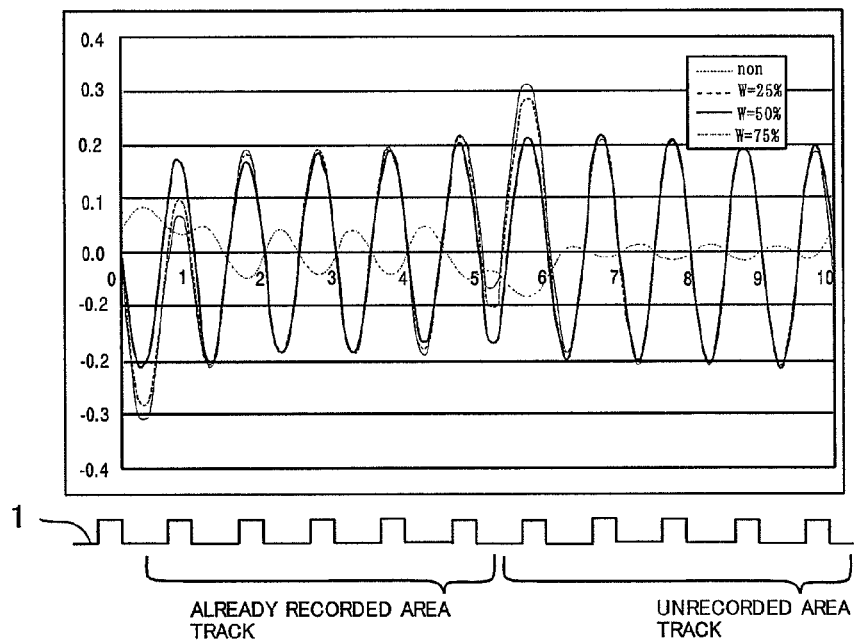
FIG. 18 is a view for explaining the state of the tracking error signal generated by the push-pull method in the optical pickup device according to the embodiment of the present invention.

When the combined width W of the inner divided areas C, D positioned axis-symmetrically is expressed as a percentage of the diameter of the light spot, FIG. 17 shows the front view of three types of hologram elements 37 where the inner divided areas C, D combined width W=25%, 50%, 75% respectively. The results of the simulation of the tracking error signal for when these three types of hologram elements 37 are used are shown in FIG. 18. FIG. 18 shows the tracking error signal TES by the push-pull method obtained when scanning the ray bundle radially across tracks of the already recorded area and of the unrecorded area on the optical disc 1.

There are compared the results for when the inner divided areas C+D combined width W=25%, 50%, 75% with the diameter of the ray bundle at the hologram element 37 being 100% and for when the hologram element 37 is not used. Where the inner divided areas C, D are set to not include the overlap regions of the diffracted light beam circles, the size of the inner divided areas C, D becomes maximal when W=50%. When W=75%, parts of the overlap regions of the diffracted light beam circles are included in the inner divided areas C, D.

Without the hologram element 37, the swing of the push-pull signal changes greatly at the boundary between the already recorded area and the unrecorded area. It can be seen that this change is slightly reduced by using the hologram element 37 of the inner divided area width W=25% and further reduced with the hologram element 37 of the inner divided area width W=50%.

However, when W=75%, components of the push-pull signal that would otherwise be included in the outer divided areas A, B are taken in by the inner divided areas C, D, and thus the signal itself is reduced.

As such, where the hologram element 37 is divided into four areas along division lines parallel to the track direction, as the combined width becomes larger with the overlap regions of the diffracted light beam circles being outside the inner divided areas C, D, the effect becomes greater.

Figure 7:
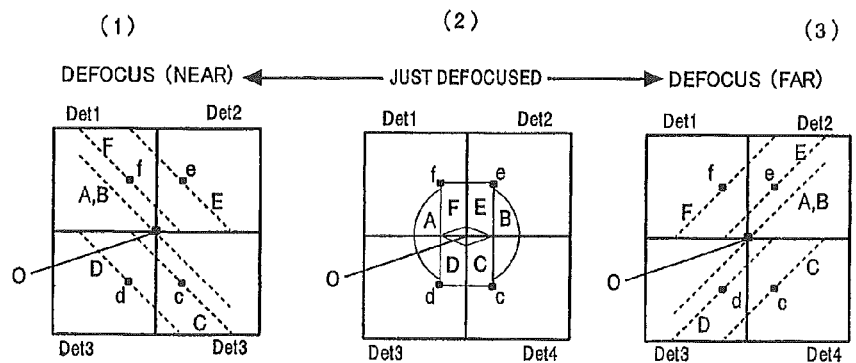
FIG. 7 is a front view of a photo detector for explaining the shape of a light spot by the astigmatism method that changes as the defocus amount is changed from in-focus position in the conventional art optical information apparatus.

The excellent effect of the present embodiment will become apparent in comparison with FIG. 7 (1), (3) in the description of the conventional art.

Figure 19:
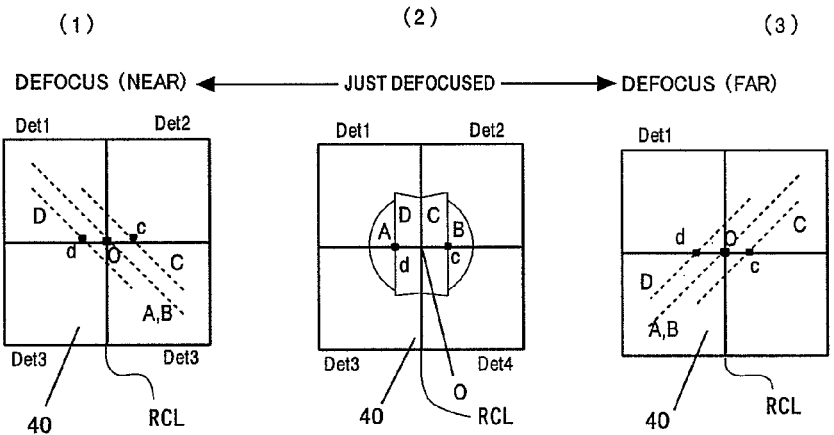
FIG. 19 is a front view of the photo detector for explaining the shape of a light spot by the astigmatism method that changes as the defocus amount is changed from in-focus position in the optical pickup device according to the embodiment of the present invention.

FIGS. 19 (1) to (3) show changes in the light spot on the photo detector 40 of the present embodiment between when defocused and when focused. In FIGS. 19 (1) to (3), light beams from the inner divided areas C, D of the hologram element 37 are exchanged in position across the detection-side division line RCL and irradiated onto the photoreceptor sections of the photo detector 40 axis-symmetrically.

As to the behavior when defocused shown in FIGS. 19 (1) and (3) (the near side and far side), the light beams from the outer divided areas A, B change to a linear light spot passing through a point O as is expected. Meanwhile, the light beam from the inner divided area C changes to a linear light spot passing through a point c, and the light beam from the area D changes to a linear light spot passing through a point d.

For example, where the light spot becomes line images of the near side, an amount of light is incident on Det2, Det3 as well, but the light amount is far smaller than in the conventional art of FIG. 7 (1). The same applies to line images of the far side of FIG. 7 (3). As a result, the swing of the FES is considerably larger than with the conventional art.

In the conventional art, a light beam is directed to a photoreceptor section of the photo detector positioned in a diagonal relationship, and hence its shift amount has to be large. As a result, five line images passing through points O, c, d, e, f greatly away from the optical axis are formed as apparent from FIGS. 7 (1) to (3), resulting in the reduced swing of the focus error signal. Meanwhile, in the present embodiment, the shifts are symmetrical with respect to the detection-side division line RCL as apparent from FIGS. 19 (1) to (3), and hence the shift amount can be small, and three line images passing through points O, c, d relatively close to the optical axis are formed. Therefore, the swings of the focus and tracking error signals when defocused can be maintained.

According to the present embodiment, the effect is obtained that the offset of the tracking error signal is reduced without increasing divisions of the photo detector and operations in number. Since the offset of the tracking error signal is reduced without an extra photo detector and increasing operations in number, the invention not only contributes to making pickup devices smaller and lower in cost but also produces a merit that transition from the conventional method is easier.

<1. Method of Dividing a Dividing Element>

The method of dividing a dividing element into deflecting functional areas need only comply with the following rule, not being limited to the division of the hologram element 37 described above.

First, the element is divided into two parts along a straight line (deflection-side division line DCL) extending parallel to the track direction and through the optical axis.

Next, the area on one side (e.g., the left half) is divided into the outer divided area A including almost all of the overlap region LR shared with the plus or minus first-order light beam diffracted by the track and the rest that is the inner divided area C. Likewise, the area on the other side (e.g., the right half) is divided into the outer divided area B including almost all of the overlap LR shared with the plus or minus first-order light beam diffracted by the track and the rest that is the inner divided area D. The outer divided areas A, B and also the inner divided areas C, D are axis-symmetrical with respect to the deflection-side division line DCL. The areas are designed to has different deflecting actions such that the light beams passing through the areas A, D are directed to one side of the photo detector 40 divided axis-symmetrically, while the light beams passing through the areas B, C are directed to the other side of the photo detector 40.

By dividing the dividing element in compliance with this rule, the inner divided areas C, D hardly include light diffracted by the track, thus producing the effect of reducing the offset of the signals.

Figure 20:
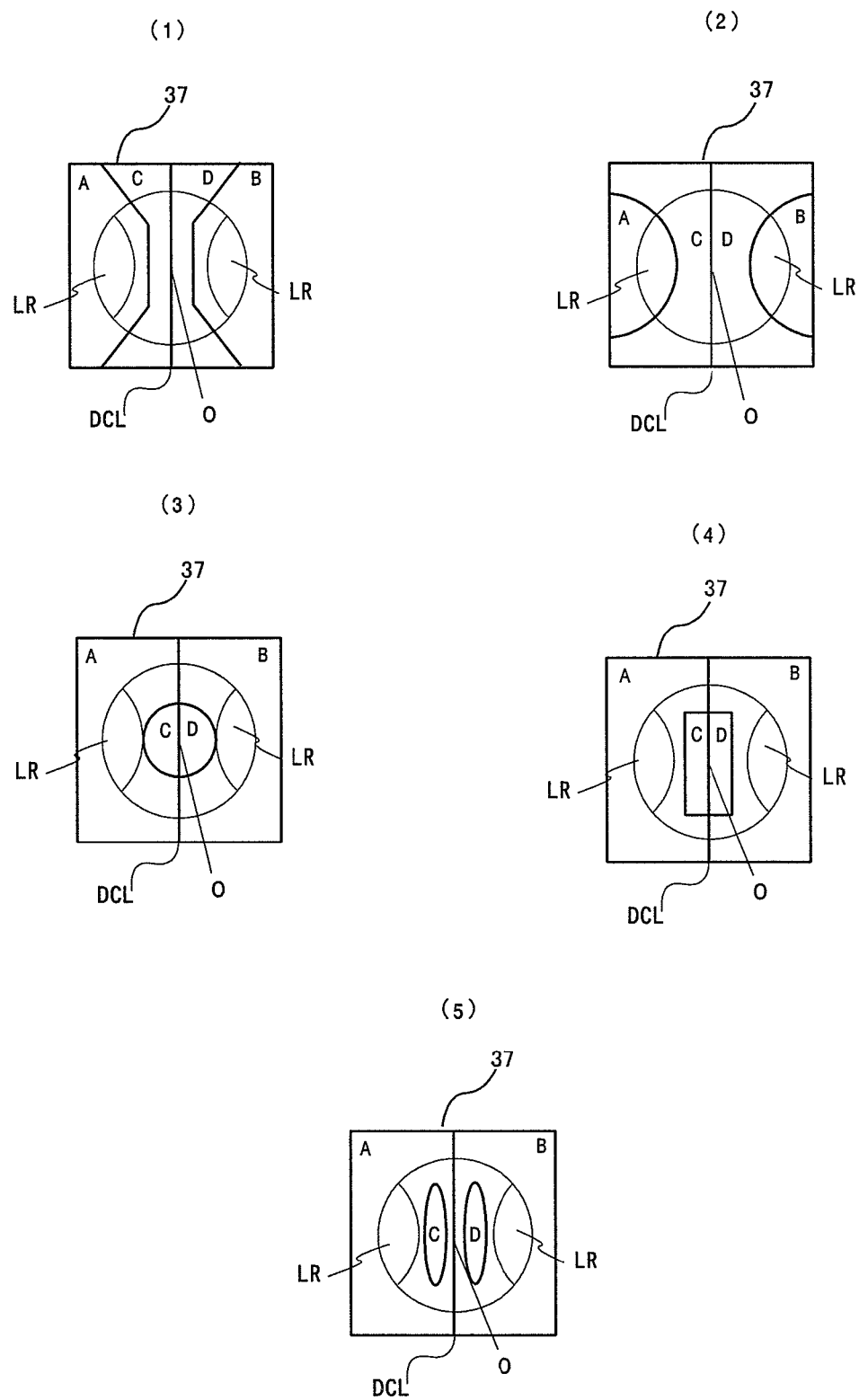
FIG. 20 is a schematic plan view showing five examples of the hologram element in the optical pickup device according to the embodiment of the present invention.

Thus, the hologram element 37 need only be divided into the inner divided areas C, D and the outer divided areas A, B axis-symmetrically along the deflection-side division line DCL. Their boundaries are not limited to parallel straight lines, but the inner divided areas C, D and the outer divided areas A, B may be divided into along boundaries bent to surround the overlap regions LR as shown in FIG. 20 (1) or boundaries going along the overlap regions LR as shown in FIG. 20 (2), or the inner divided areas C, D may be divided into along a circular closed boundary with the optical axis as the center and in contact with the overlap regions LR as shown in FIG. 20 (3) or a rectangular closed boundary with the optical axis as the center and away from the overlap regions LR as shown in FIG. 20 (4) or circular closed boundaries away from the deflection-side division line DCL and the overlap regions LR as shown in FIG. 20 (5), which all produce the same effect.

<2. Arranging Method for a Dividing Element>

Although in the above examples, hologram patterns are provided in the inner divided areas C, D of the hologram element, hologram patterns may be provided in the outer divided areas A, B.

The point is that light beams from the outer divided area A and the inner divided area C apart from each other and light beams from the outer divided area B and the inner divided area D apart from each other need to be directed to the photoreceptor sections on the respective same sides of the detection-side division line RCL of the photo detector 40 axis-symmetrically.

<3. Addition of a Fifth Area (No-hologram Pattern Area)>

Figure 21:
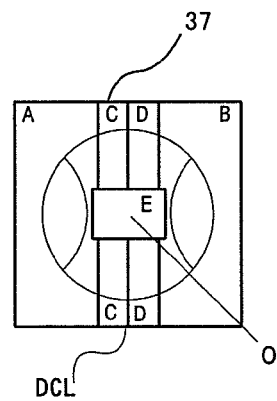
FIG. 21 is a schematic plan view showing another example of the hologram element in the optical pickup device according to the embodiment of the present invention.
Figure 22:
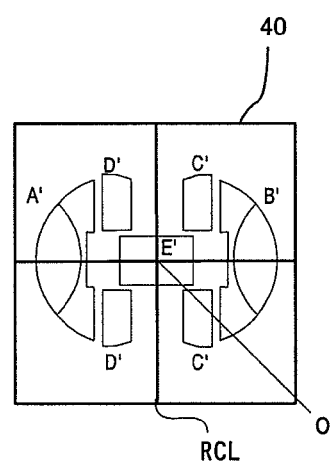
FIG. 22 is a schematic plan view showing another example of the photo detector in the optical pickup device according to the embodiment of the present invention.
Figure 23:
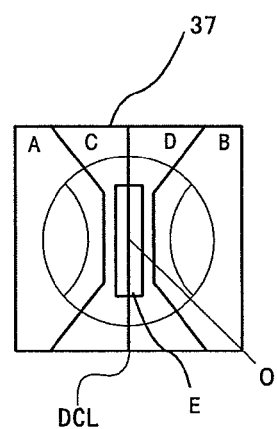
FIG. 23 is a schematic plan view showing another example of the hologram element in the optical pickup device according to the embodiment of the present invention.
Figure 24:
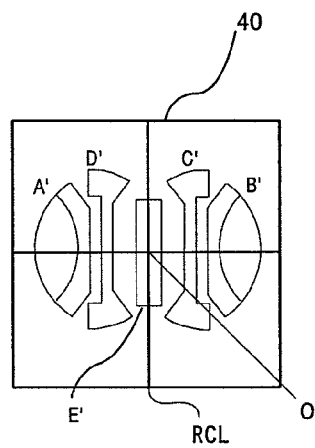
FIG. 24 is a schematic plan view showing another example of the photo detector in the optical pickup device according to the embodiment of the present invention.

The dividing element can be configured to have a transmissive or shielding area around the return light optical axis in the inner divided areas that is of a point-symmetrical shape with respect to the return light optical axis. For example, in addition to the above division configuration of the dividing element, a transmissive area E without diffracting means such as a hologram pattern may be provided which is point-symmetrical with respect to the return light optical axis as shown in FIG. 21. The hologram element 37 of FIG. 21 is the same as the one of FIG. 11 except that it has a transmissive area E around the optical axis which divides each of the inner divided areas C, D into two parts. FIG. 22 shows the light distribution over the photoreceptor sections of the photo detector 40 by this hologram element 37. As shown in FIG. 22, the light beams from the outer divided areas A, B of the hologram element 37 are directed to the photoreceptor sections of the photo detector 40 to be A', B' axis-symmetrical with respect to the detection-side division line RCL; the light beams from the inner divided areas C, D to be D', C' likewise; and the light beam from the transmissive area E to be E' likewise. As another example, the hologram element 37 shown in FIG. 23 is configured such that a transmissive area E is sandwiched between the inner divided areas C, D. FIG. 24 shows the light distribution over the photoreceptor sections of the photo detector 40 by this hologram element 37. As shown in FIG. 24, the light beams from the outer divided areas A, B of the hologram element 37 are directed to the photoreceptor sections of the photo detector 40 to be A', B' axis-symmetrical with respect to the detection-side division line RCL; the light beams from the inner divided areas C, D to be D', C' likewise; and the light beam from the transmissive area E to be E' likewise.

By adding the area E around the return light optical axis which does not contribute to signal generation, a not-dividing area is provided around the optical axis, thus reducing the decrease in the swing of the focus error signal . Instead of the transmissive area E, providing a shielding area point-symmetrical with respect to the return light optical axis also produces the same effect.

<4. Positions on the Photo Detector of Divided Light Spots>

In FIGS. 12, 19, 22, 24, the light spots A' to D', E' from the areas A to D, E are formed on the photoreceptor sections of the photo detector 40 so as not to overlap each other, but A' and C' (and E') and also B' and D' (and E') may overlap each other.

<5. Device in the Dividing Element of Avoiding the Interference Between Divided Light Beams>

Figure 25:
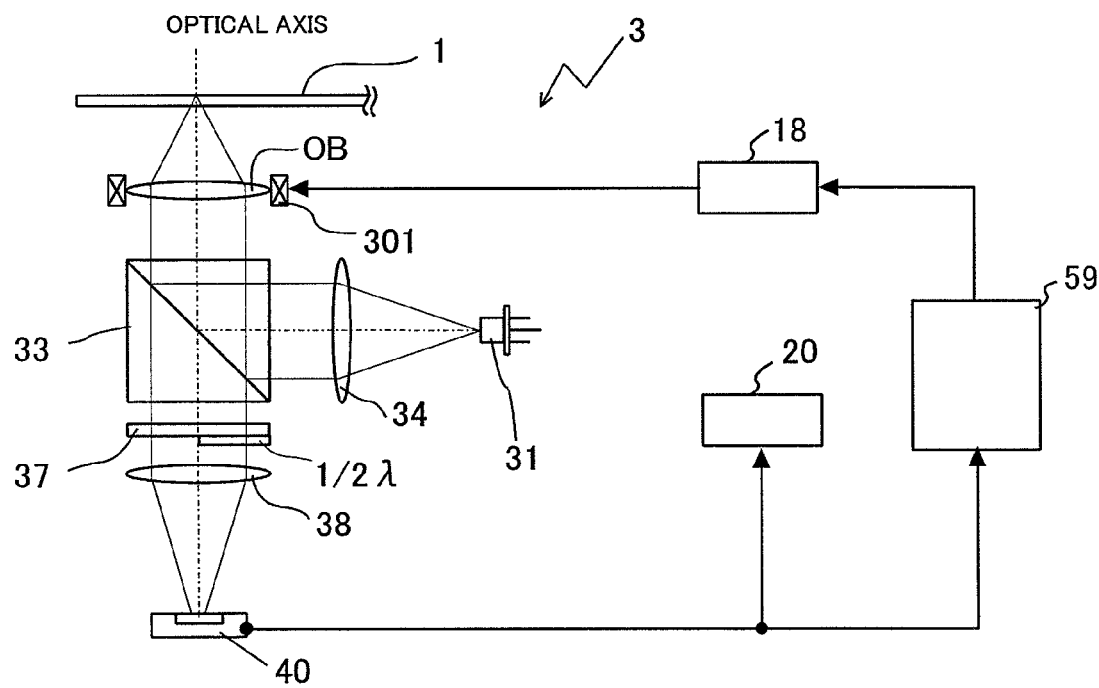
FIG. 25 is a diagram schematically showing the configuration of an optical pickup device according to another embodiment of the present invention.

As shown in FIG. 25, a ½ wavelength plate ½λ may be placed covering the outer and inner divided areas A, C on one side of the deflection-side division line DCL on the hologram element 37. A pickup device 3 of FIG. 25 is the same as the one of FIG. 8 except that the ½ wavelength plate ½λ is placed over the hologram element 37. For example, in addition to the above division configuration of the dividing element, a ½ wavelength plate ½λ may be placed over the outer and inner divided areas A, C on one side of the deflection-side division line DCL as shown in FIGS. 26 (1) to (11). By this means, the light beams from the areas A, D irradiated onto one side of the photo detector 40 and also the light beams from the areas B, C irradiated onto the other side become polarized differently, thereby avoiding interference in the photo detector 40. Part of the ½ wavelength plate for the area E may exist but may be omitted. Of course, the dividing element may be configured such that the ½ wavelength plate ½λ covers the outer and inner divided areas B, D on the other side of the hologram element 37 (not shown).

Moreover, the hologram element 37 may be configured such that the ½ wavelength plate ½λ, is placed covering the outer divided areas A, B as shown in FIGS. 27 (1) to (11).

Figure 28:
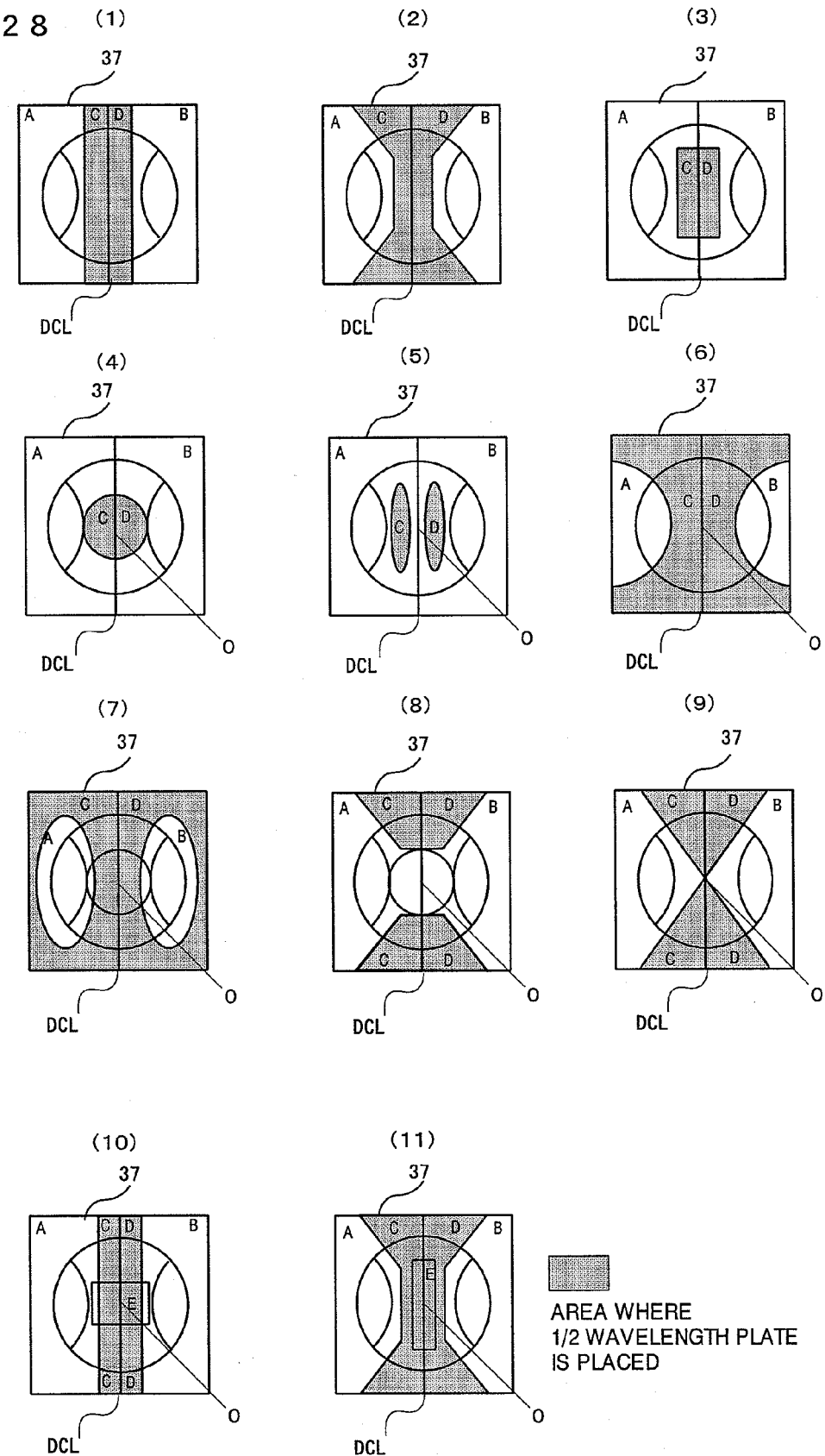
FIG. 28 is a schematic plan view showing other 11 examples of the hologram element in the optical pickup device according to the embodiment of the present invention.

Still moreover, the hologram element 37 may be configured such that the ½ wavelength plate ½λ is placed covering the inner divided areas C, D as shown in FIGS. 28 (1) to (11).

<6. Dividing Elements Other than Hologram Elements>

In the above 1. to 5., instead of the hologram element 37 as a dividing element, a prism or a liquid crystal optical element may be used. As to the method of dividing the hologram element or the prism, it can be arbitrarily divided as long as in compliance with the previously-mentioned rule, and by changing the size of the inner divided areas C, D, the same effect can be obtained as when changing the value of the k of the equation (4). In the case of the configuration where light beams from the areas C, D are deflected using a liquid crystal element, by changing the voltage applied to the areas, the same effect can also be obtained as when changing the value of the k of the equation (4).

<7. Other Variants>

Instead of the above example pickup configuration, the pickup device may be configured, for example, to have the beam splitter 33 for splitting light beams replaced with a polarization beam splitter and a ¼ wavelength plate placed between this splitter and the objective lens.

In the above example, the hologram element 37, a dividing element, is placed on the photo detector 40 side of the beam splitter 33, but when the polarization beam splitter and the ¼ wavelength plate are used, a dividing element can be placed on the optical disc side of the beam splitter for splitting light beams. In this case, a polarization hologram element 37b is used as the hologram element.

Figure 29:
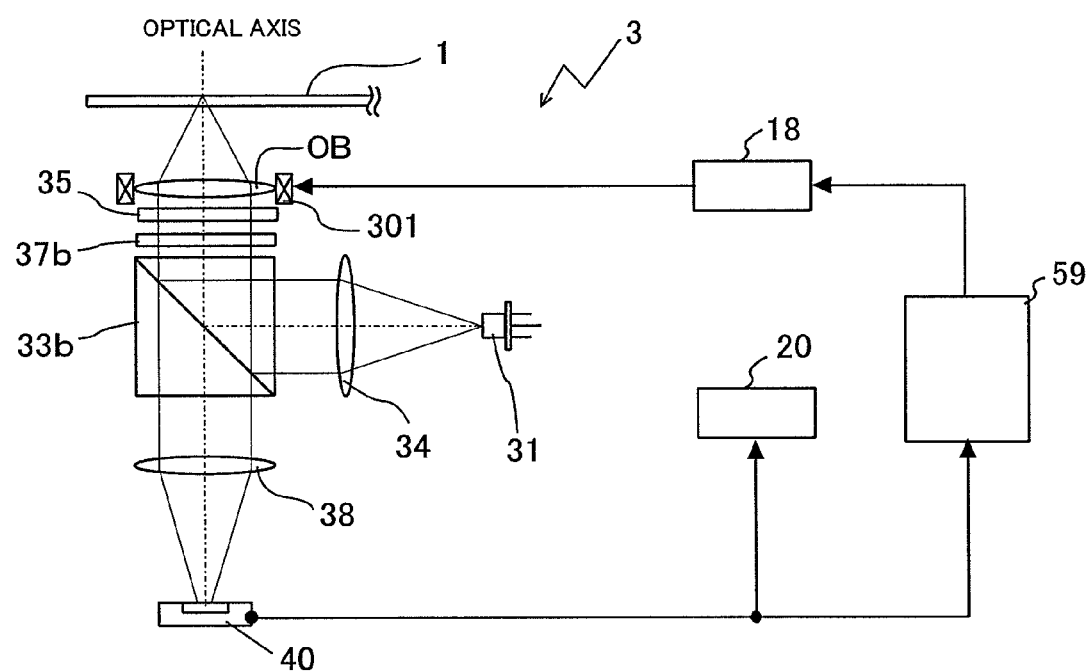
FIG. 29 is a diagram schematically showing the configuration of an optical pickup device according to another embodiment of the present invention.

FIG. 29 shows a pickup device using the polarization hologram element 37b. The pickup device 3 of FIG. 29 is the same as the one of FIG. 8 except that the beam splitter is replaced with the polarization beam splitter 33b and that the polarization hologram 37b and a ¼ wavelength plate 35 are provided between the polarization beam splitter 33b and the objective lens OB with the hologram element on the photo detector side removed.

Light emitted from the light source is made to be parallel light by the collimator lens 34 and reaches the polarization beam splitter 33b, which reflects and directs the light to the optical disc 1.

Then, the light passes through the polarization hologram element 37b, which at this point does not act on the light because of the direction of its linear polarization, and passes through the ¼ wavelength plate 35 to be circularly polarized and is focused on a recording surface of the optical disc 1 by the objective lens OB. Reflected light from the optical disc goes through the objective lens OB again to be parallel light and passes through the ¼ wavelength plate 35 again to be linearly polarized. The direction of the linear polarization at this point is 90 degrees different from that of the linear polarization on the forward path.

Then, the light passes through the polarization hologram element 37b, which acts on the light having that direction of linear polarization, thus diffracting the light.

Multiple light beams divided into by the polarization hologram element 37b (as produced by the hologram element 37) are led through the polarization beam splitter 33b and the detection lens 38 to the photo detector 40.

In this case, the objective lens OB, the ¼ wavelength plate 35, and the hologram element may be driven in unity. With the configuration where the hologram element and the objective lens OB are driven in unity, the optical axis can be prevented from deviating from the center of the hologram element when the objective lens OB is driven in a tracking direction.

The invention claimed is:

1. A pickup device comprising an irradiation optical system including an objective lens to focus a ray bundle on a track of a recording surface of an optical recording medium to form alight spot, and a detection optical system including a photo detector to receive return light reflected from said light spot via said objective lens and perform photoelectric conversion and controls said objective lens in position according to electrical signals produced through operations on outputs of said photo detector,
   wherein said photo detector has at least one pair of photoreceptor sections positioned axis-symmetrical with respect to a detection-side division line extending parallel to said track and traversing an optical axis of said return light;
   wherein said pickup device comprises a dividing element placed in an optical path between said photo detector and said objective lens;
   wherein said dividing element includes at least one pair of symmetric inner divided areas positioned axis-symmetrical with respect to a deflection-side division line extending parallel to said track and traversing said optical axis of said return light, and at least one pair of symmetric outer divided areas positioned sandwiching said symmetric inner divided areas and axis-symmetrical with respect to said deflection-side division line;
   wherein said symmetric outer divided areas include overlap regions shared by ±first-order light beams diffracted by said track and a zeroth-order light beam of said return light and direct light beams from said overlap regions to said photoreceptor sections of said photo detector so as to be axis-symmetrical with respect to said detection-side division line;
   wherein said symmetric inner divided areas direct parts of a light beam from the other region than said overlap regions to said photoreceptor sections of said photo detector so as to be axis-symmetrical with respect to said detection-side division line, said other region being divided axis-symmetrically along said deflection-side division line; and
   wherein said symmetric inner divided areas are formed such that the parts of the light beam from the other region than said overlap regions intersect each other and are exchanged in position across said detection-side division line and directed to said photoreceptor sections of said photo detector, alternatively said symmetric outer divided areas are formed such that the light beams from said overlap regions intersect each other and are exchanged in position across said detection-side division line and directed to said photoreceptor sections of said photo detector,
   the pickup device further comprising a ½ wavelength plate positioned in an optical path of said return light to overlie only a group of areas on the same side of said symmetric inner divided areas and symmetric outer divided areas positioned axis-symmetrical with respect to said deflection-side division line on said dividing element.

2. A pickup device comprising an irradiation optical system including an objective lens to focus a ray bundle on a track of a recording surface of an optical recording medium to form a light spot, and a detection optical system including a photo detector to receive return light reflected from said light spot via said objective lens and perform photoelectric conversion and controls said objective lens in position according to electrical signals produced through operations on outputs of said photo detector,
   wherein said photo detector has at least one pair of photoreceptor sections positioned axis-symmetrical with respect to a detection-side division line extending parallel to said track and traversing an optical axis of said return light;
   wherein said pickup device comprises a dividing element placed in an optical path between said photo detector and said objective lens;
   wherein said dividing element includes at least one pair of symmetric inner divided areas positioned axis-symmetrical with respect to a deflection-side division line extending parallel to said track and traversing said optical axis of said return light, and at least one pair of symmetric outer divided areas positioned sandwiching said symmetric inner divided areas and axis-symmetrical with respect to said deflection-side division line;
   wherein said symmetric outer divided areas include overlap regions shared by ±first-order light beams diffracted by said track and a zeroth-order light beam of said return light and direct light beams from said overlap regions to said photoreceptor sections of said photo detector so as to be axis-symmetrical with respect to said detection-side division line;
   wherein said symmetric inner divided areas direct parts of a light beam from the other region than said overlap regions to said photoreceptor sections of said photo detector so as to be axis-symmetrical with respect to said detection-side division line, said other region being divided axis-symmetrically along said deflection-side division line; and
   wherein said symmetric inner divided areas are formed such that the parts of the light beam from the other region than said overlap regions intersect each other and are exchanged in position across said detection-side division line and directed to said photoreceptor sections of said photo detector, alternatively said symmetric outer divided areas are formed such that the light beams from said overlap regions intersect each other and are exchanged in position across said detection-side division line and directed to said photoreceptor sections of said photo detector,
   the pickup device further comprising a ½ wavelength plate positioned in an optical path of said return light to overlie only said symmetric inner divided areas on said dividing element.

3. A pickup device comprising an irradiation optical system including an objective lens to focus a ray bundle on a track of a recording surface of an optical recording medium to form a light spot, and a detection optical system including a photo detector to receive return light reflected from said light spot via said objective lens and perform photoelectric conversion and controls said objective lens in position according to electrical signals produced through operations on outputs of said photo detector, wherein said photo detector has at least one pair of photoreceptor sections positioned axis-symmetrical with respect to a detection-side division line extending parallel to said track and traversing an optical axis of said return light;

wherein said pickup device comprises a dividing element placed in an optical path between said photo detector and said objective lens;

wherein said dividing element includes at least one pair of symmetric inner divided areas positioned axis-symmetrical with respect to a deflection-side division line extending parallel to said track and traversing said optical axis of said return light, and at least one pair of symmetric outer divided areas positioned sandwiching said inner symmetric divided areas and axis-symmetrical with respect to said deflection-side division line;

wherein said symmetric outer divided areas include overlap regions shared by ±first-order light beams diffracted by said track and a zeroth-order light beam of said return light and direct light beams from said overlap regions to said photoreceptor sections of said photo detector so as to be axis-symmetrical with respect to said detection-side division line;

wherein said symmetric inner divided areas direct parts of a light beam from the other region than said overlap regions to said photoreceptor sections of said photo detector so as to be axis-symmetrical with respect to said detection-side division line, said other region being divided axis-symmetrically along said deflection-side division line; and wherein said symmetric inner divided areas are formed such that the parts of the light beam from the other region than said overlap regions intersect each other and are exchanged in position across said detection-side division line and directed to said photoreceptor sections of said photo detector, alternatively said symmetric outer divided areas are formed such that the light beams from said overlap regions intersect each other and are exchanged imposition across said detection-side division line and directed to said photoreceptor sections of said photo detector, the pickup device further comprising a ½ wavelength plate positioned in an optical path of said return light to overlie only said symmetric outer divided areas on said dividing element.

4. A pickup device according to any of claims 1-3, wherein said dividing element has a transmissive or shielding area around said optical axis of said return light in said symmetric inner divided areas that is of a point-symmetrical shape with respect to said optical axis of said return light.

5. A pickup device according to any of claims 1-3, wherein boundaries between said symmetric inner divided areas and said symmetric outer divided areas do not intersect with said overlap regions.

* * * * *